Figure 1:
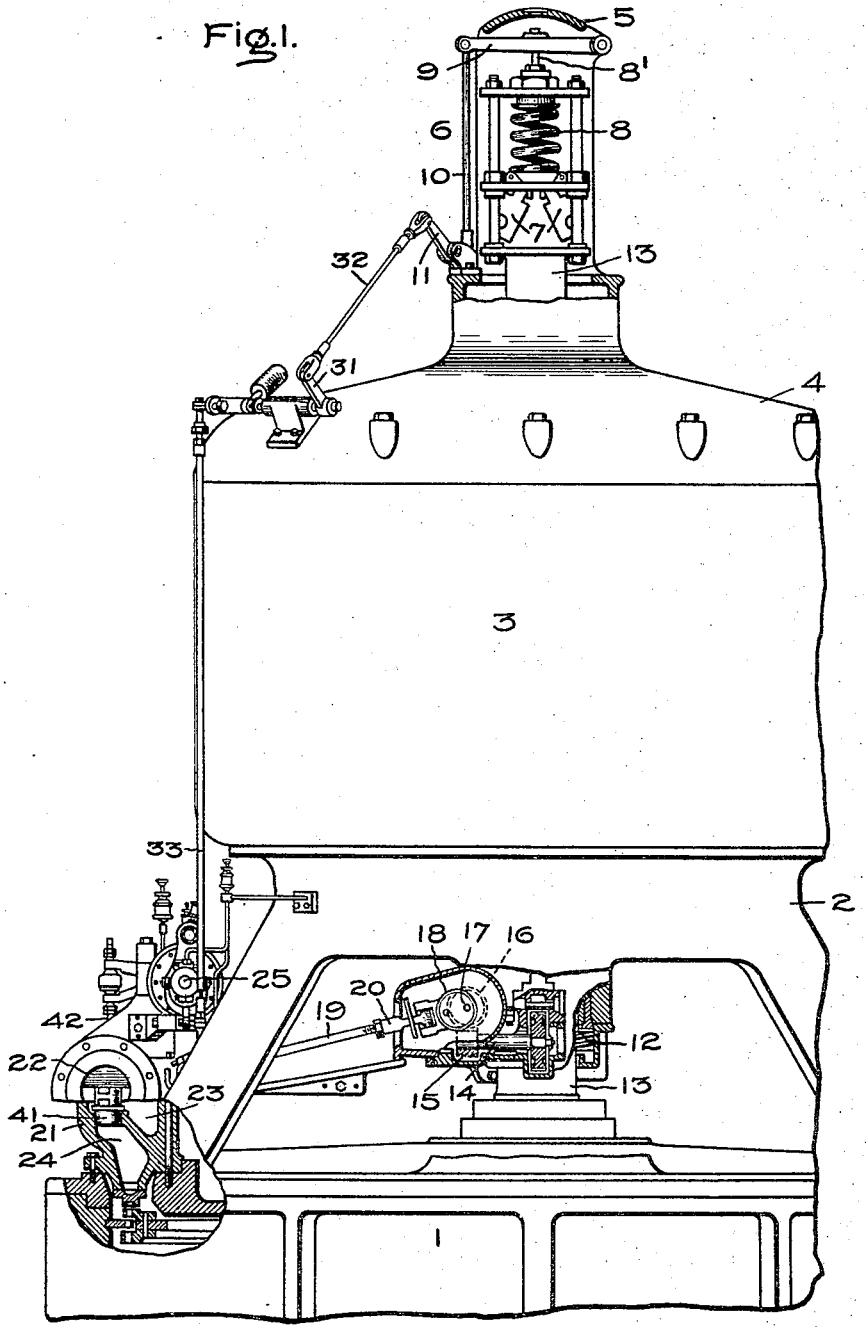

J. G. CALLAN.
GOVERNING MECHANISM FOR ELASTIC FLUID TURBINES.
APPLICATION FILED MAY 18, 1908.

951,301.

Patented Mar. 8, 1910.
4 SHEETS—SHEET 4.

Witnesses:
Marcus L. Byng.
Helen Orford

Inventor,
John G. Callan,
By Albert H. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

GOVERNING MECHANISM FOR ELASTIC-FLUID TURBINES.

951,301. Specification of Letters Patent. Patented Mar. 8, 1910.

Application filed May 18, 1908. Serial No. 433,348.

*To all whom it may concern:*

Be it known that I, JOHN G. CALLAN, a citizen of the United States, residing at Lynn, county of Essex, State of Massachusetts, have invented certain new and useful Improvements in Governing Mechanism for Elastic-Fluid Turbines, of which the following is a specification.

The present invention relates to governing mechanism for elastic fluid turbines and more especially for turbines of the impact type. Its object is to improve the construction of such mechanism by providing improved means for operating the valves which admit the motive fluid and for controlling the operation of said valves.

In the mechanism shown in the accompanying drawings which illustrate a typical application of my invention, the valves for admitting motive fluid to the turbine, or the different stages thereof, are so arranged that they are capable of throttling the flow of fluid both while opening and while closing, thereby supplying at all times an amount of steam in strict accordance with the load requirements. Each valve is made up of two valves or parts whereby closer regulation is obtained with a given number of valves and the work required to move them is decreased, but my invention can be used with other forms of valves than those illustrated. The smaller of the two valves will, for convenience, be termed the primary valve and the larger one, the secondary valve. Each primary valve is so arranged that it opens before and closes after its corresponding secondary valve. The secondary valve is actuated by means of its primary valve so that the primary valves not only act as admission valves but also serve as actuators for the secondary valves. The primary valves have stems which are positively moved both in opening and closing by levers and cams. The cams are mounted on a shaft which is rocked backward and forward as conditions demand by a continuously moving pawl mechanism and a ratchet under the control of a governor sensitive to speed variations. The governor acts to connect said mechanism to the cam shaft for moving the valves and to disconnect it therefrom when the amount of steam flowing satisfies the load requirements. A follow-up device is also provided to coöperate with the pawl mechanism and the ratchet to prevent overtravel of the valves and their actuating means. The valves are unbalanced as to pressure and since to secure close regulation it is necessary to accurately position both the primary and secondary valves with respect to their seats, I provide a friction lock for the cam shaft which is automatically locked when one or more valves are to be held in a given position, and unlocked or released when it is desired to move them to a new position.

For a more complete understanding of the invention, attention is directed to the following description and the claims appended thereto.

Figure 2:
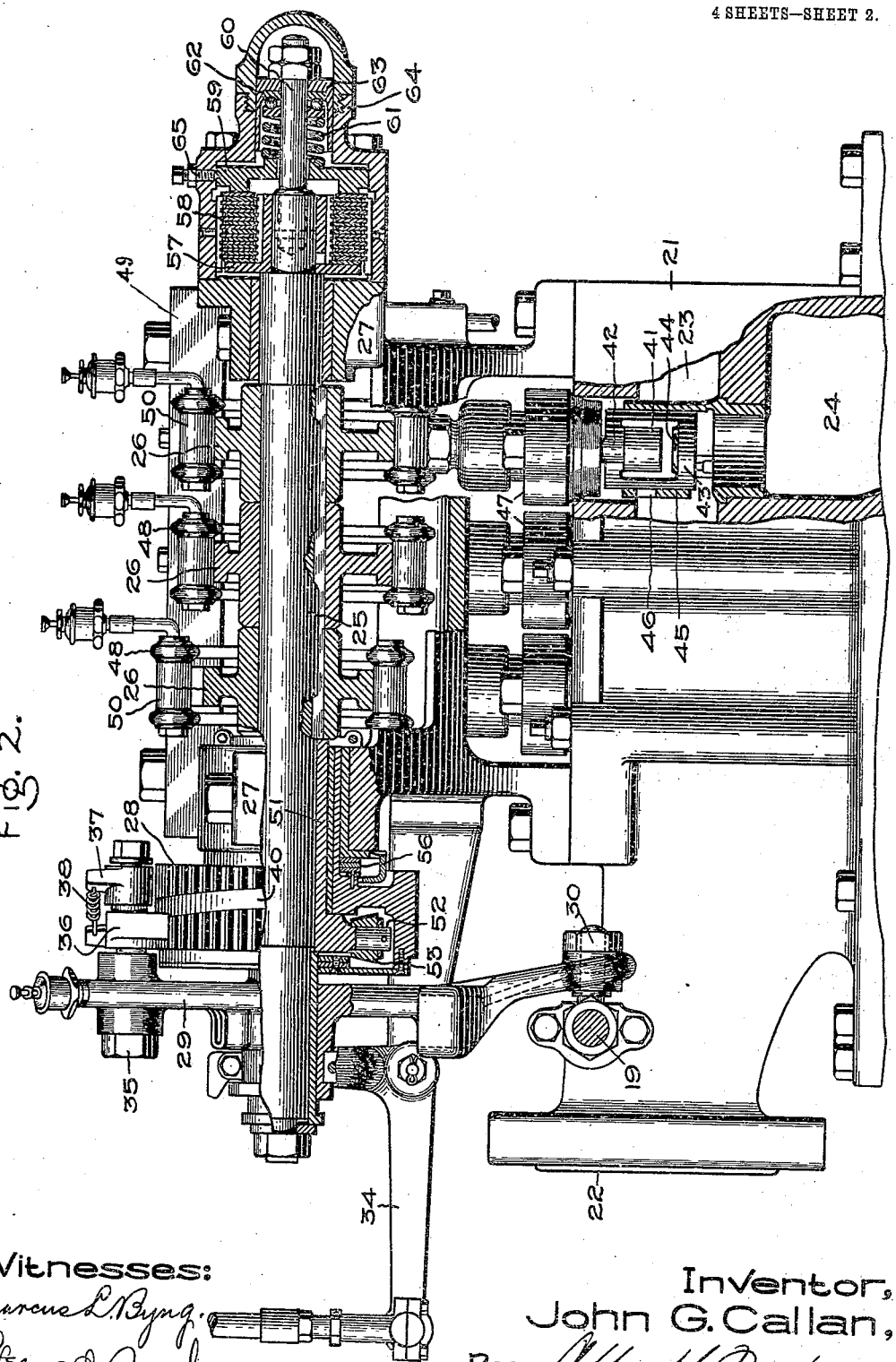
Figure 3:
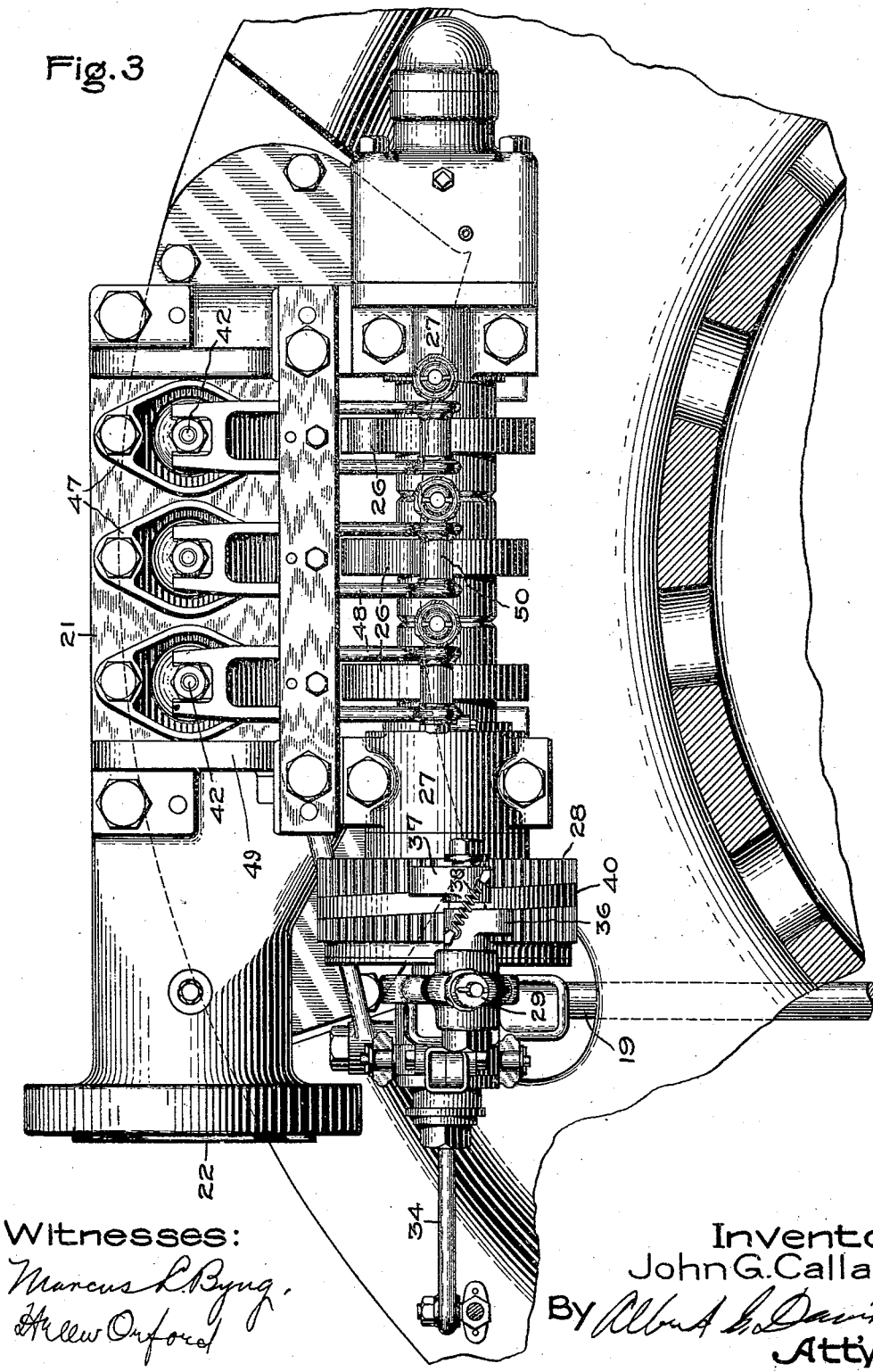
Figure 4:
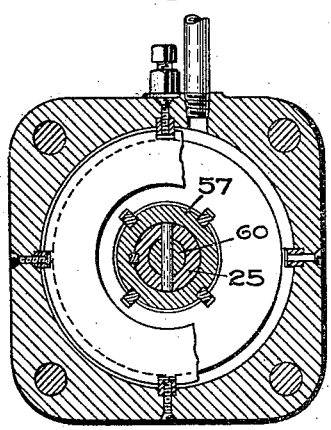

In the accompanying drawings which illustrate one of the embodiments of my invention, Figure 1 is a partial side view of a turbo-generator equipped with my improved governing mechanism with some of the parts in section; Fig. 2 is a longitudinal section of the valve cams and coöperating parts; Fig. 3 is a plan view of the valve cams and their actuating mechanism; Fig. 4 is a detail sectional view of the friction clutch or lock for holding the cam shaft and the valves in proper position; and Figs. 5 to 8, inclusive, are detail views of the means for releasing the clutch mechanism which locks the cam shaft in position.

On the upper end 1 of the turbine is located a stool 2 carrying an electric generator 3. The top of the generator is provided with a cover 4 which supports a dome 5 that incloses a speed governor 6 comprising weights 7 and an opposing spring 8, all mounted on the end of the main shaft 13 of the turbo-generator. The motion of the governor due to speed changes is transmitted by a rod 8' to the horizontal lever 9 pivoted on the dome beyond the end of the shaft. The free end of the lever 9 is connected by a rod 10 with a bell-crank lever 11 mounted on the base of the dome. The transmission of motion from this lever to the valve-actuating mechanism proper is described farther on.

As it is necessary to have a constantly moving element ready at all times while the turbine is running to perform the work of moving the valves, a worm 12 is mounted on the main shaft 13 to drive a worm-wheel on the secondary shaft 14. On the shaft 14 is a worm 15 meshing with a worm-wheel 16 carried by a shaft 17 on the end of which is an eccentric 18. The eccentric is provided with a strap that is connected to a rod 19, to which the eccentric imparts a to-and-fro movement as it rotates. Since the lever actuated by the outer end of the eccentric rod is moved from time to time by the governor in a direction perpendicular to the plane of the eccentric, a universal coupling 20 is provided between the eccentric and the inner end of the rod to accommodate this relative movement.

Mounted on the turbine casing is a valve chest 21, Figs. 1, 2 and 3, having an inlet 22 that receives steam from a boiler or other source of supply. In the chest is a supply chamber 23 containing a plurality of valves. In the present illustration three valves are shown. Each valve controls the flow of motive fluid to a passage 24 which supplies one, two or more fluid discharging passages of a nozzle or nozzles or other fluid discharging devices. Situated above the valve chest is a horizontal shaft 25 upon which the cams 26, one for each valve, are mounted. The shaft is supported by the bearings 27.

On the left end of the shaft 25, Figs. 2 and 3, is a ratchet wheel 28, by means of which the cam shaft is rotated step-by-step in a forward or backward direction from a given position. Loosely mounted on the same end of the shaft is a pawl-actuating lever 29 which oscillates freely on the shaft when no change in the position of the valves is required. This lever is actuated by the eccentric 18 and its rod, the outer end of the rod being connected by the pivot 30 to the lever. The longitudinal position of the lever on the shaft is determined by the governor 6, Fig. 1, through the medium of the rod 8′, lever 9, rod 10, levers 11 and 31, rods 32 and 33, and bell-crank lever 34, Fig. 2. The bell-crank lever is pivoted on a bracket secured to the valve chest and one end of it is forked to receive the hub of the oscillating pawl-actuating lever 29.

Mounted in the upper end of the lever 29 is a stud 35 carrying the pawls 36 and 37 extending in opposite directions from the axis of the stud and held in operative relation to the ratchet wheel 28 by the extension spring 38 attached to projections on the pawls. Inasmuch as there are times when the pawls should not act as well as times when they should,—it being noted that the lever 29 is constantly oscillating,—a special means is provided to keep the pawls out of engagement with the ratchet wheel teeth when they should not work and to permit them to engage said teeth when the wheel is to be moved. This means for controlling the action of the pawls comprises a shield or member 40 carried by the ratchet wheel which presents a smooth peripheral surface of the same diameter as the points of the ratchet wheel teeth, and is arranged to follow a helical path with respect to the sides of the wheel. Any movement of the lever 29 along the shaft 25 changes the axial position of the pawls with respect to the shield and it is this change in position that regulates or determines the action of the pawls on the ratchet wheel. The pawls, due to their own weight and the action of the spring 38, tend at all times to operatively engage the ratchet teeth and this tendency is opposed by the shield so long as it is in a neutral position.

The cam shaft in practice usually moves at each step an angular distance equal to the pitch of the ratchet wheel teeth, but under certain conditions it may move a distance equal to several times this distance, depending upon the suddenness and the amount of the change in the load. When the load change is sudden and large, the opening or closing of a secondary valve follows that of its primary valve so closely that they constitute in effect a single valve. The shield 40 is of such width and is so arranged that when the flow of steam past the valves exactly satisfies the load requirements, the corners of the pawls adjacent the shield will ride thereon and it will prevent the pawls from acting on the ratchet wheel. This arrangement of the pawls and shield is particularly effective since the pawls are either wholly out of engagement or fully in engagement with the ratchet wheel teeth, thereby avoiding breaking the teeth and pawls. Owing to its shape and to the fact that it changes its position with respect to the pawls for each degree that it is moved in either direction, the shield constitutes a follow-up device and prevents the overtravel of the valves and their actuating means.

Assuming the parts to be ready to operate, as best illustrated in Fig. 3, and the pawl-carrying end of the lever 29 moving to the left about the axis of the shaft 25, Fig. 1, or as viewed from the bottom of Sheet 3 of the drawings, the pawl 37 will engage a tooth on the ratchet wheel and rotate the same to the left or contra-clockwise, Fig. 1,—say for example, a distance equal to one tooth. The same movement will cause the pawl 36 to ride onto the shield 40, the tooth directly under it lifting it against the action of the spring 38. Owing to this lifting action the pawl will ride onto the shield without any shock. This same movement also advances the shield plate angularly a distance equal to the pitch of the teeth and on account of its helical arrangement its effect on the operation of the pawls is changed. On the return or backward stroke, the pawl 37 will be lifted by the tooth directly under it and be caused to ride onto the shield. The pawl 36 will for a portion of the stroke also ride on the shield and at or about the end of said stroke it may pass off the shield, depending upon the position of the latter and whether or not the governor has altered the axial position of the pawl relative to the shield. In the event of the valve opening being sufficient to satisfy the load conditions, the pawl will stop just short of leaving its engagement with the shield and will not engage the ratchet wheel teeth. If this condition continue, the pawl 37 will do no work on the forward stroke because it also will ride on the shield throughout its movement. This relation of the parts will continue until there is a speed change. Then the governor will shift the pawls axially of the shaft in one direction or the other from the position described and the next movement of the lever 29 will rotate the ratchet wheel and cam shaft by an amount dependent upon the load and hence upon the speed change.

Each admission valve comprises a primary valve 41 mounted on a stem 42 and located inside of a secondary valve 43, the latter having an internal seat 44 for the former. The secondary valve is a hollow puppet valve and is slotted at one side to receive the primary valve and the valve stem 42 when assembling the parts. Surrounding the secondary valve is a sleeve 45 having one or more ports 46. This sleeve is seated in the wall of the valve chest and in addition to forming a seat for the valve 43 also acts as a guide for it. These valves control the flow of the motive fluid from the chamber 23 to the passages 24, the space above the primary valves being in communication with the chamber. The distance between the seat 44 and the top portion of the secondary valve is greater than the length of the primary valve, so that when the valve stem is raised by the cam 26 the primary valve will first open and permit an amount of steam proportional to the size of its opening to flow. Thereafter as the primary valve is raised higher from the seat 44, it will engage and lift the secondary or larger valve so that steam can flow through the port or ports 46. In closing the secondary valve is first seated and then the primary.

The sleeve 45 is of the same diameter as the opening above it in the valve chest so that it can be inserted or withdrawn through said opening. The opening is covered by a head 47, bolted to the valve chest, containing a suitable packing for the valve stem 42 which rises vertically from the chest and is coupled to a lever 48 mounted on the frame 49 adjacent the cam shaft. The levers 48 are actuated by the cams 26. The inner ends of the levers are provided with antifriction rollers 50 that travel on the periphery of the cams and the outer ends are forked to receive the valve stems 42. Nuts are provided on the stems above and below the levers for the purpose of effecting any necessary adjustment. The cams may be made of any shape suitable to accomplish the desired result, namely, that when the cam shaft is rocked one way or the other, the valves will be opened or closed in succession. The active portions of the several cams are angularly advanced one with respect to another about the axis of the shaft, so that the primary and the secondary valves will be opened and closed in the desired successive order. After the rollers of a given lever pass off the active portions of its cam, further movement of the lever is prevented because the inactive portions of said cam are concentric with the axis of the shaft and hence the cams and the shaft can move to bring the active portions of other cams into engagement with their levers without affecting the position in which said lever is held.

Figure 5:
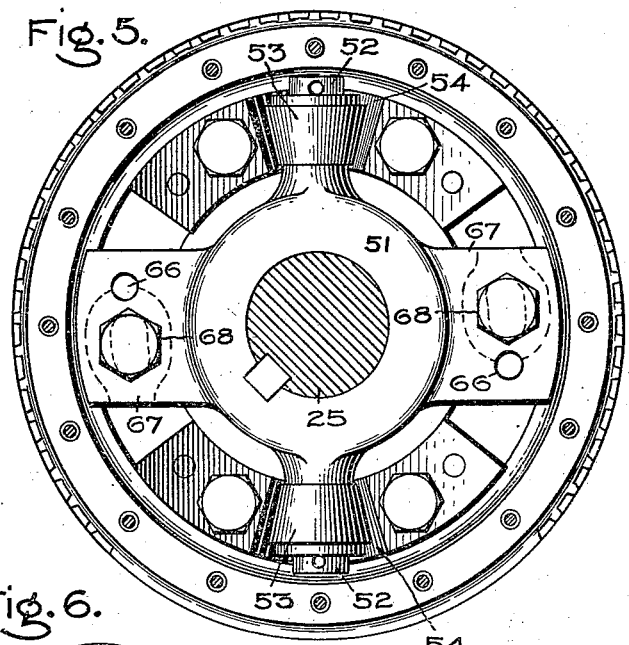
Figure 6:
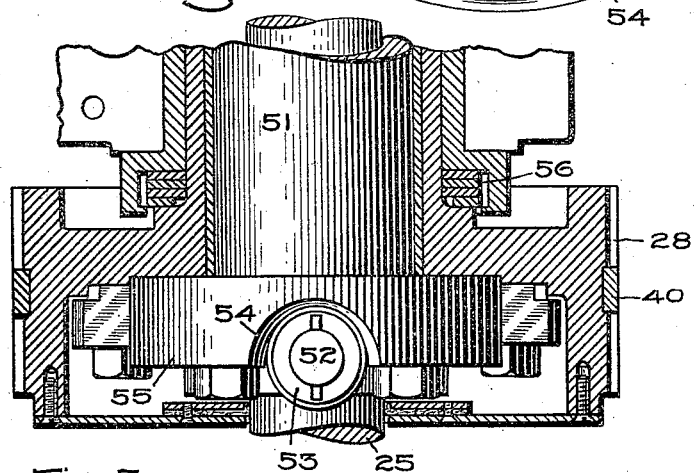
Figure 7:
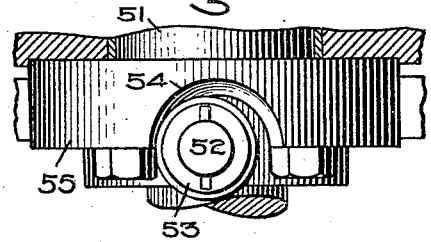
Figure 8:
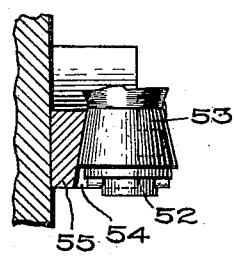

The locking means for the cam shaft will now be described in detail. Surrounding the cam shaft and located between it and the hub of the ratchet wheel 28, Figs. 2 and 6, is a sleeve 51 having two diametrically opposed arms 52 projecting therefrom, Fig. 5. Each arm is provided with a conical roller 53 at its outer end. These rollers are located in openings 54 of substantially semicircular shape formed by cutting away the disk or head 55 formed on or attached to the inside of the ratchet wheel. The parts normally stand as shown in Figs. 2 and 5, that is to say, with the pawls moving to and fro without actuating the cam shaft. Between the right side of the ratchet wheel and the lining of the adjacent bearing 27 are hardened thrust washers 56 or rollers, or both. Secured to the right end of the shaft, Fig. 2, is a sleeve 57 having a flange which forms an abutment for a plurality of thin steel disks 58 forming part of a friction clutch or lock. The sleeve is prevented from moving longitudinally to the left on the shaft 25 by means of a shoulder or other equivalent device. At the right of the disks is a fixed abutment 59. Between the abutment 59 and an adjustable and movable head or abutment on a rod 60 secured to the end of the shaft 25, is a compression spring 61, a ball bearing 62 being provided to reduce friction between the spring and the head. The head, bearing and spring are inclosed in a cup-shaped member 63 which is guided by the cylindrical wall of an inclosing casing 64. The abutment 59 is held in position by the pin or bolt 65. Half of the disks 58 are splined to the sleeve 57 and so rotate with the shaft, while the remainder are splined to the casing 64 and are therefore prevented from rotating. The spring 61 is of such strength and acts in such a manner that when the parts are not being moved by the action of the pawls 36 and 37, it forces the shaft, sleeve 57 and the disks 58 toward the right, Fig. 2. The abutment 59 opposes this movement of the disks and they are held in frictional contact between the members 57 and 59, while the rollers 53 are maintained in mid-position as shown in Fig. 6, and the cams and their coöperating levers and valves are consequently locked against movement.

Assuming the parts to be locked in position and the pawl 36, Figs. 2 and 3, about to move the ratchet wheel, the first portion of the active stroke of the pawl will move the wheel in a clockwise direction and the rollers 53 will ride up the inclined or cam surfaces 54 of the disk 55. Since the wheel is prevented from moving to the right by the thrust washers 56, it follows that the shaft 25 as a whole will be moved slightly to the left against the opposing action of the spring 61 as the rollers 53 move up the incline, and the pressure causing the frictional engagement between the disks 58 will be released. When this occurs the shaft and its attached parts are free to move under the action of the pawl. As soon as the pawl lets go on its return stroke, the spring 61 will cause the rollers to move down the incline and will force the parts of the clutch into frictional contact, thus locking the shaft 25 against further angular movement until one or the other of the pawls is again permitted to move the ratchet wheel. Since the shaft must turn forward and backward to open and close the valves, it follows that the locking device must be double acting. This action is secured by making the cam portions 54 on the head 55 symmetrical on both sides of the center. Thus no matter which way the ratchet wheel is turned the rollers 53 will first release the lock or clutch and thereafter turn the shaft.

Under some conditions it may be desirable to omit the unlocking feature in which case the disks will act as a retarding device at all times and the pawls will have to overcome the load occasioned thereby. This may be done in the mechanism illustrated by rendering the unlocking device inoperative by inserting pins in the holes 66 in the arms 67, Fig. 5, and clamping the parts in position by the bolts 68. When so arranged the ratchet wheel and the shaft will at all times move as one member. The bolts 68 pass through slots in the arms 67, shown in dotted lines, and when not used to clamp the parts as above described they act as additional means for preserving the alinement of the parts.

From the foregoing it will be seen that the lever 29, Fig. 2, is constantly oscillating to and fro due to its connection with the worm on the main shaft and the gearing driven thereby. The pawls 36 and 37, Fig. 3, stand ready at all times to perform the work of moving the cam shaft 25, Fig. 2, when permitted to do so by the speed governor. After one or the other of the pawls moves the ratchet wheel and the shaft, the helical shield comes into play and acting as a follow-up device prevents overtravel of the apparatus.

Assuming a given number of primary and secondary valves to be closed and a given number open, and the load to increase slightly accompanied by a decrease in speed, the action of a pawl in moving the cam shaft and its cams will cause one of said cams to open a primary valve to an extent dependent upon the load change. The locking means will then, through the cam shaft and the cams, hold the valve in this open position until a change in load calls for a corresponding change in the steam supply. Further increase of the load will open the primary valve still further. A continued increase of load will cause the primary valve to positively and mechanically open the secondary valve until the latter is wide open. As soon as one secondary valve is fully open the regulating mechanism opens the next primary valve in the series, then its secondary valve, and so on until the demand for more steam is satisfied. Upon a decrease in load, assuming some of the valves to be fully opened and the remainder closed, a secondary valve will start into operation and gradually throttle the supply until it is seated. If this reduction of the steam supply is insufficient to satisfy the load conditions its primary valve will close gradually and so on, throughout the series.

So much of the governing mechanism shown and described in this application as is not claimed herein is the invention of Richard H. Rice, and forms the subject-matter of a separate application, Serial No. 371,590, filed by him on May 3, 1907, in which my invention is shown as applied and used with his invention.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a governing mechanism, the combination of a plurality of valves, cams for operating them, a shaft carrying the cams, governor controlled means for actuating the shaft step-by-step, a locking device for the shaft comprising disks normally held in frictional contact, and means for relieving the frictional contact between the disks preparatory to moving the shaft.

2. In a governing mechanism, the combination of a plurality of valves, cams for operating them, a shaft carrying the cams, a ratchet and pawl mechanism located at one end of the shaft for rotating it forward and backward, a friction lock located at the other end of the shaft, means for moving the shaft endwise to release the lock, a driving member for the pawls, and a governor controlling the action of the ratchet and pawl mechanism.

3. In a governing mechanism, the combination of a valve, a means for actuating it, a driving shaft for the means, a ratchet wheel on the shaft, pawls mounted for engagement with the ratchet wheel teeth, a helically disposed shield on the ratchet wheel which partly controls the action of the pawls on said wheel, and a governor which primarily controls the action of the pawls on said wheel.

4. In a governing mechanism, the combination of a valve which has an inherent tendency to move when away from its seat, a shaft-driven means for moving it in a manner to throttle the flow of fluid past the seat, a locking device for holding said means in any desired position, an actuator for the shaft, and a releasing device which is under the control of the actuator and moves said locking device longitudinally with respect to the shaft to release the same.

5. In a governing mechanism, the combination of a valve which has an inherent tendency to move when away from its seat, a shaft-driven means for moving it in a manner to throttle the flow of fluid past the seat, a lock for said means comprising a plurality of metal disks, a spring to cause them to engage, an actuator for the shaft, and a device moved by the actuator which frees the disks from contact.

6. In a governing mechanism, the combination of a shaft, cams mounted thereon, valves actuated by the cams, a lock located at one end of the shaft, a device for releasing the lock located at the other end of the shaft, a means for actuating the shaft, and a governor for said means.

7. In a governing mechanism for a prime mover, the combination of a shaft, cams mounted thereon, valves for controlling the flow of motive fluid to the prime mover that are actuated by the cams, a lock located at one end of the shaft, a device for releasing the lock located at the other end of the shaft and comprising means for moving the shaft endwise, and a means for moving the shaft as the load on the prime mover varies.

8. In a governing mechanism, the combination of a shaft, cams mounted thereon, levers actuated by the cams, valves controlled by the levers, a lock located at one end of the shaft and comprising a plurality of disks, part of which are stationary and part movable, a spring tending at all times to move the shaft endwise and cause the disks to engage, a cam at the other end of the shaft which moves the shaft endwise to release the disks, and a means for actuating the shaft and the cams.

9. In a governing mechanism, the combination of a valve, means for actuating it, a shaft for driving said means, a ratchet wheel for moving the shaft having a helical shield on its periphery, a pawl mechanism for actuating the ratchet wheel, and a governing device for moving the pawl mechanism and the shield relative to each other in a direction axially of the shaft to vary the extent of the engagement of said mechanism with the wheel.

10. In a governing mechanism, the combination of a valve, means for actuating the valve, a shaft for driving said means, a lever loosely mounted on the shaft, mechanism for oscillating the lever, pawls carried by the lever, a ratchet wheel on the shaft adjacent the lever having a helical shield on its periphery and ratchet teeth disposed adjacent the shield, the surface of the shield being at the same distance from the center of the wheel as the points of the teeth, and governing means for moving the lever and pawls axially on the shaft to change the relative position of the shield and the pawls and thereby vary the extent of the engagement of the pawls with the teeth.

11. In a governing mechanism, the combination of an actuating shaft, a pawl and ratchet mechanism for moving the shaft comprising a ratchet wheel having a helical shield on its periphery and teeth adjacent said shield, a lever adjacent the wheel, a pawl carried by the lever which engages said teeth, means for oscillating the lever and pawl about the axis of the wheel, and means for moving the pawl and the shield relative to each other in an axial direction to vary the distance that the wheel is rotated by the pawl, said shield also acting as a follow-up device to prevent overtravel of the parts.

12. In a governing mechanism, the combination of an actuating shaft, a pawl and ratchet mechanism for moving it comprising a ratchet wheel having teeth on its periphery, a helical shield on said periphery adjacent the teeth and of substantially the same diameter as the points of the teeth which serves as a follow-up device to prevent overtravel of the parts, and means for moving the pawl portion of said mechanism and the shield relative to each other in an axial direction to vary the distance that the wheel is rotated thereby.

13. In a governing mechanism, the combination of a plurality of valves, cams for operating them, a shaft carrying the cams, a ratchet mounted on the shaft, a lever loosely sleeved on the shaft, pawls carried by the lever and extending in opposite directions for engagement with the teeth of the ratchet, power driven means for actuating the lever, a second lever connected to the first for sliding it along the shaft, and a governor connected to the second lever for actuating it.

In witness whereof, I have hereunto set my hand this fifteenth day of May, 1908.

JOHN G. CALLAN.

Witnesses:
 JOHN A. McMANUS, Jr.,
 CHARLES A. BARNARD.